A. McDONALD.
RAILROAD FISHPLATE, SPIKE, AND NUT LOCK.
APPLICATION FILED JULY 29, 1921.
1,408,374.
Patented Feb. 28, 1922.
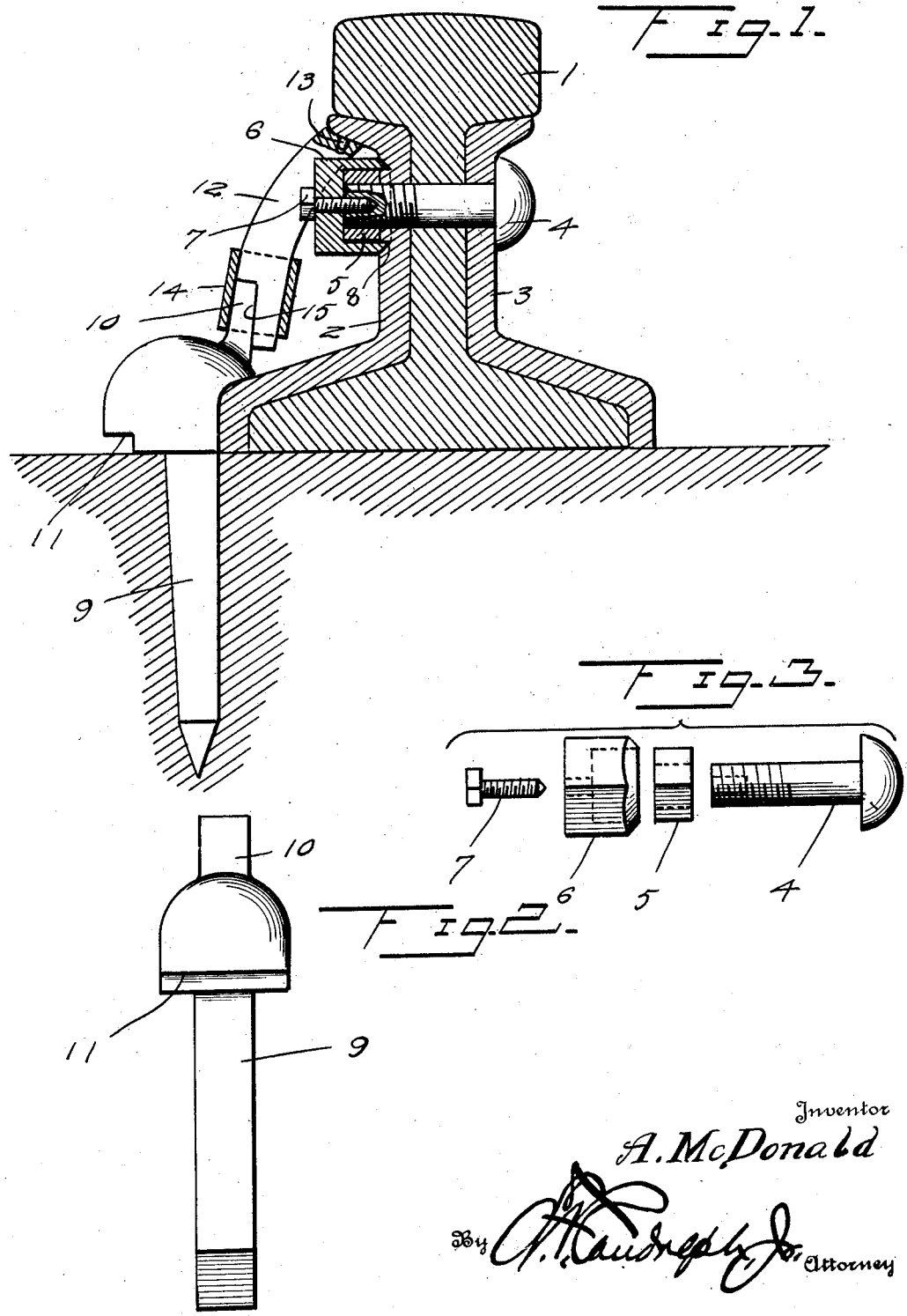

UNITED STATES PATENT OFFICE.

ANGUS McDONALD, OF NEW GLASGOW, CANADA, ASSIGNOR OF ONE-THIRD TO HAROLD PUTNAM, TRURO, NOVA SCOTIA, CANADA, AND ONE-THIRD TO CHARLES T. CONRAD, OF HALIFAX, NOVA SCOTIA, CANADA.

RAILROAD FISHPLATE, SPIKE, AND NUT LOCK.

1,408,374.     Specification of Letters Patent.     Patented Feb. 28, 1922.

Application filed July 29, 1921. Serial No. 488,352.

*To all whom it may concern:*

Be it known that I, ANGUS McDONALD, a subject of the King of Great Britain, residing at New Glasgow, in the Province of Nova Scotia and Dominion of Canada, have invented certain new and useful Improvements in Railroad Fishplates, Spikes, and Nut Locks; and I do hereby declare the following to be a full, clear, and exact description of the invention, such as will enable others skilled in the art to which it appertains to make and use the same.

This invention relates to rail joints and more particularly to the securing means such as the fish plate, spike and bolt fastenings to prevent loosening of the nut thereof.

A further purpose of the invention is to brace the rail and prevent displacement of the bracing and rail securing means, one forming a lock for the other.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the drawings hereto attached,

Figure 1 is a vertical transverse section of a rail joint illustrating an embodiment of the invention, Figure 2 is a detail view of the spike, and Figure 3 is a detail view of the nut lock.

Corresponding and like parts are referred to in the following description and designated in the several views of the drawings by like reference characters.

The joint embodies rail ends 1 of usual formation. Fish plates 2 and 3 are disposed upon opposite sides of the joint and are held in place by means of bolts 4 in a manner well understood. Each of the bolts 4 is supplied with a nut 5. Locking means are associated with each of the nuts 5 and consist of a cap 6 and a screw 7. The cap 6 snugly fits the nut 5 and its inner end is beveled to enter a corresponding recess 8 in a side of the fish plate 2. The screw 7 passes through an opening in the head of the cap 6 and enters a threaded opening in the end of the bolt 4, the thread being the reverse of that provided between the nut 5 and bolt 4. The fish plates overlie the foot of the rail and underlap the head thereof. The joint is thus well braced against vertical stress.

Each of the spikes 9 is provided with a vertical extension 10. A portion of the under side of the head is stepped as indicated at 11.

A brace 12 is disposed upon the outer side of the joint between the upper and lower lateral extensions of the fish plate 2. The lower end of the brace 12 engages the vertical extension 10 of the spike. The upper end of the brace 12 engages a projection 13 at the upper edge of the fish plate 2. The parts 10 and 13 retain the brace 12 in place against accidental movement. A recess 15 is formed in the lower portion of the brace 12 to receive the vertical extension 10. A sleeve or band 14 slidable on the brace 12 is adapted to close the recess 15 and retain the extension 10 in position. When placing the brace 12 in position, its upper end is engaged with the projection 13 and after its lower end engages the extension 10, the sleeve 14 is moved downwardly thereby retaining the parts against accidental displacement.

What is claimed is:

1. In a rail joint, a fish plate at one side of the joint, a spike securing the lower edge portion of the fish plate, a brace between the head of the spike and the upper edge portion of the fish plate, and inter-engaging means between the respective ends of the brace and the head of the spike and the upper edge portion of the fish plate respectively.

2. In rail securing means, a fish plate having a projection at its upper edge, a spike having a vertical extension, a brace between the spike and said upper edge portion of the fish plate and engaging the said projection and vertical extension, and means slidable on the brace and adapted to engage the vertical extension of the spike.

In testimony whereof I affix my signature in presence of two witnesses.

ANGUS McDONALD.

Witnesses:
    L. L. BLACK,
    I. F. GREENHALL.